(12) United States Patent
Moriyama

(10) Patent No.: US 11,479,089 B2
(45) Date of Patent: Oct. 25, 2022

(54) SIDE DOOR STRUCTURE OF VEHICLE

(71) Applicant: MAZDA MOTOR CORPORATION, Hiroshima (JP)

(72) Inventor: Yukihiro Moriyama, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/342,190

(22) Filed: Jun. 8, 2021

(65) Prior Publication Data
US 2022/0001725 A1 Jan. 6, 2022

(30) Foreign Application Priority Data

Jul. 2, 2020 (JP) .............................. JP2020-114749

(51) Int. Cl.
*B60J 5/04* (2006.01)
(52) U.S. Cl.
CPC ........... *B60J 5/0412* (2013.01); *B60J 5/0468* (2013.01); *B60J 5/0472* (2013.01)
(58) Field of Classification Search
CPC ...... B60J 5/0412; B60J 5/0468; B60J 5/0472; E05C 17/30
See application file for complete search history.

(56) References Cited

U.S. PATENT DOCUMENTS

| 6,513,193 | B1* | 2/2003 | Yezersky | .............. | E05C 17/203 |
| | | | | | 16/86 A |
| 11,149,475 | B2* | 10/2021 | Kito | ......................... | E05B 81/20 |
| 2013/0074412 | A1* | 3/2013 | Wellborn | .............. | E05C 17/003 |
| | | | | | 16/85 |

FOREIGN PATENT DOCUMENTS

| DE | 102016102510 A1 * | 8/2017 | .......... E05C 17/006 |
| JP | 2008-308840 A | 12/2008 | |
| JP | 2011-017239 A | 1/2011 | |

* cited by examiner

*Primary Examiner* — Joseph D. Pape
(74) *Attorney, Agent, or Firm* — Studebaker & Brackett PC

(57) ABSTRACT

There are provided a hinge pillar having a closed-cross section extending in a vehicle vertical direction, a side door body comprising a door outer and a door inner, a door trim provided to cover the door inner from a cabin inside, and a stay damper arranged between the door inner and the door trim such that the stay damper extends rearwardly from a front end thereof which is attached to the hinge pillar and to a rear end thereof which is attached to the door inner.

13 Claims, 9 Drawing Sheets

SIDE DOOR STRUCTURE OF VEHICLE

BACKGROUND OF THE INVENTION

The present invention relates to a side door structure of a vehicle which comprises a stay damper, one end of which is pivotally connected to a hinge pillar as a vehicle-body frame member extending in a vehicle vertical direction along a front edge of a side-door opening and the other end of which is pivotally connected to a side door, for example.

In the side door structure of the vehicle in which the vicinity of a front-end side of the side door is pivotally connected to a vehicle body via a hinge, a structure which comprises a stay damper for a swing-type door to assist opening/closing of the side door, one end of which is pivotally connected to a vehicle-body side and the other end of which is pivotally connected to the vicinity of the front-end side of the side door is known.

Japanese Patent Laid-Open Publication No. 2011-017239, for example, discloses a stay damper, one end of which is pivotally connected to a side sill as a vehicle-body frame member extending in a vehicle longitudinal direction along a lower edge of the side-door opening and the other end of which is pivotally connected to a lower portion of a side door. This stay damper is provided to extend between the vehicle body and the side door at a position which corresponds to a level of feet of a passenger who is getting on the vehicle, so that there is a concern that this stay damper may deteriorate the vehicle getting on/off property of the passenger.

Further, Japanese Patent Laid-Open Publication No. 2008-308840 discloses a structure which comprises a side door having a penetration (through) hole formed at its front portion and a stay damper, one end of which is pivotally connected to a hinge pillar and the other end of which is pivotally connected to an inside of the side door such that the stay damper extends through the above-described penetration hole. In this type of stay damper in which the stay damper is configured to extend beyond a border of a pour-water area and a water-proof area, it is required to provide a seal member at this border so that water may not come into the water-proof area from the pour-water area through the border.

Accordingly, the structure disclosed in the above-described patent document also discloses a dust boots as a water-stopping member having flexibility which is provided between an edge portion of the penetration hole and the stay damper so as to prevent water or dust from coming into a cabin inside through the penetration hole formed at the border when the side door is closed.

However, since the stay damper swings in a vehicle width direction according to an opening/closing motion of the side door, it is necessary that the above-described penetration hole has a properly-large size, considering a range of this swinging of the stay damper, so that the stay damper does not interfere with an edge of the penetration hole improperly.

Therefore, the size of the seal member, such as the dust boots or the water-stopping member, may become improperly large-sized according to the large-sized penetration hole in the structure disclosed in the above-described patent document, so that there is still room for improvement in the material costs, the layout property, the maintenance property, and like of the seal member.

SUMMARY OF THE INVENTION

The present invention has been devised in view of the above-described problem, and an object of the present invention is to provide a side door structure of a vehicle which can properly arrange the stay damper without requiring the above-described seal member nor deteriorating the vehicle getting on/off property of the passenger.

The present invention is a side door structure of a vehicle, comprising a hinge pillar provided at a vehicle body, the hinge pillar having a closed-cross section extending in a vehicle vertical direction, a side door body comprising a door outer and a door inner, a door trim provided to cover the door inner from a cabin inside, and a stay damper arranged between the door inner and the door trim such that the stay damper extends rearwardly from a front end thereof which is attached to the hinge pillar and to a rear end thereof which is attached to the door inner.

According to the present invention, the stay damper can be properly arranged without requiring the above-described seal member nor deteriorating the vehicle getting on/off property of the passenger.

In an embodiment of the present invention, a side wall portion of the door inner has a recessed portion which is configured such that a part of the side wall portion of the door inner is recessed toward a cabin outside and to extend rearwardly from a front end thereof, and the stay damper is arranged in the recessed portion.

According to this embodiment, a gap between the door trim and a standard face of the door inner can be made properly small, and the support rigidity (in an extension direction of the stay damper) of the stay damper by the door inner can be improved.

In another embodiment of the present invention, the door inner has a front wall portion at a front end of the side wall portion such that the front wall portion is located at a position which faces a rear wall portion of the hinge pillar, a door-inner front part including the front wall portion is made of a casting member, and the recessed portion is continuous to the front wall portion.

According to this embodiment, the recessed portion can be made continuous to the front wall portion properly by making the door-inner front part of the casting member, so that the appearance and the anti-pour water property of the door inner can be improved.

In another embodiment of the present invention, the side wall portion of the door inner which extends rearwardly beyond the door-inner front part is made of a panel member, and the panel member is configured to have a split structure such that the recessed portion is a member which is separate from a base panel part of the side wall portion which corresponds to another part than the recessed portion.

According to this embodiment, the size of the recessed portion can be made properly compact and the rigidity of the side wall portion made of the panel member can be made properly high.

Herein, it is preferable that the stay damper be a damper for a swing door to assist opening action of the side door relative to the vehicle body, which comprises a cylindrical-shaped cylinder body and a rod body which is inserted into the cylinder body so as to project from the cylinder body, and the rod body of the stay damper be configured to project from the cylinder body by a gas pressure sealed in the cylinder body.

It is also preferable that a whole part of the stay damper be arranged in a trim inside space which is formed between the door inner and the door trim.

Further, it is preferable that the stay damper be configured such that a tip of the rod body is attached to the vehicle body via a bracket positioned on a side of the rod body and a bottom-side end of the cylinder body is attached to a side of the door body via a bracket positioned on the cylinder body.

Moreover, it is preferable that the stay damper be arranged along a vehicle longitudinal direction such that when the side door is closed, a tip of the rod body is directed toward a vehicle forward side and a bottom-side end of the cylinder body is directed toward a vehicle rearward side.

The side wall portion of the door inner which extends rearwardly beyond the door-inner front part may be made of the panel member, and this panel member may be configured to be integrally made including a portion corresponding to the recessed portion instead of the above-described split structure.

The present invention will become apparent from the following description which refers to the accompanying drawings.

DETAILED DESCRIPTION OF THE INVENTION

Figure 1:
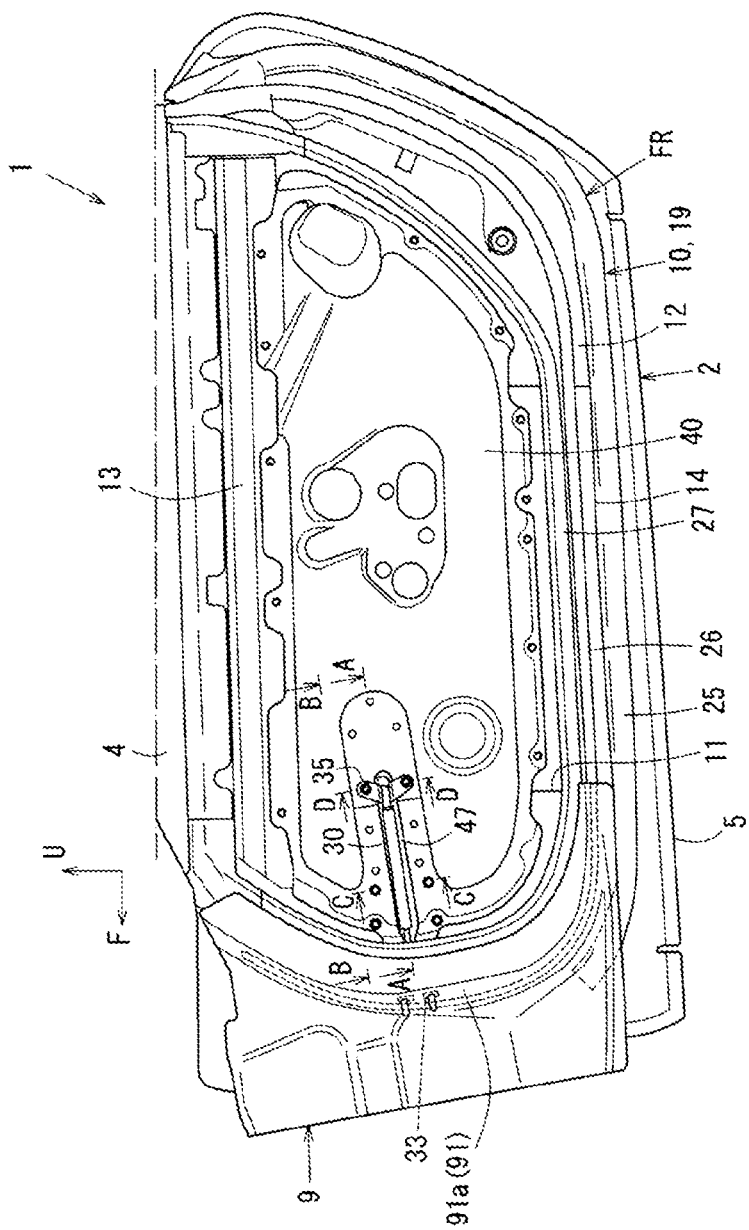
FIG. 1 is a side view of a major part of a side door structure of the present embodiment, when viewed from a cabin inside.
Figure 2:
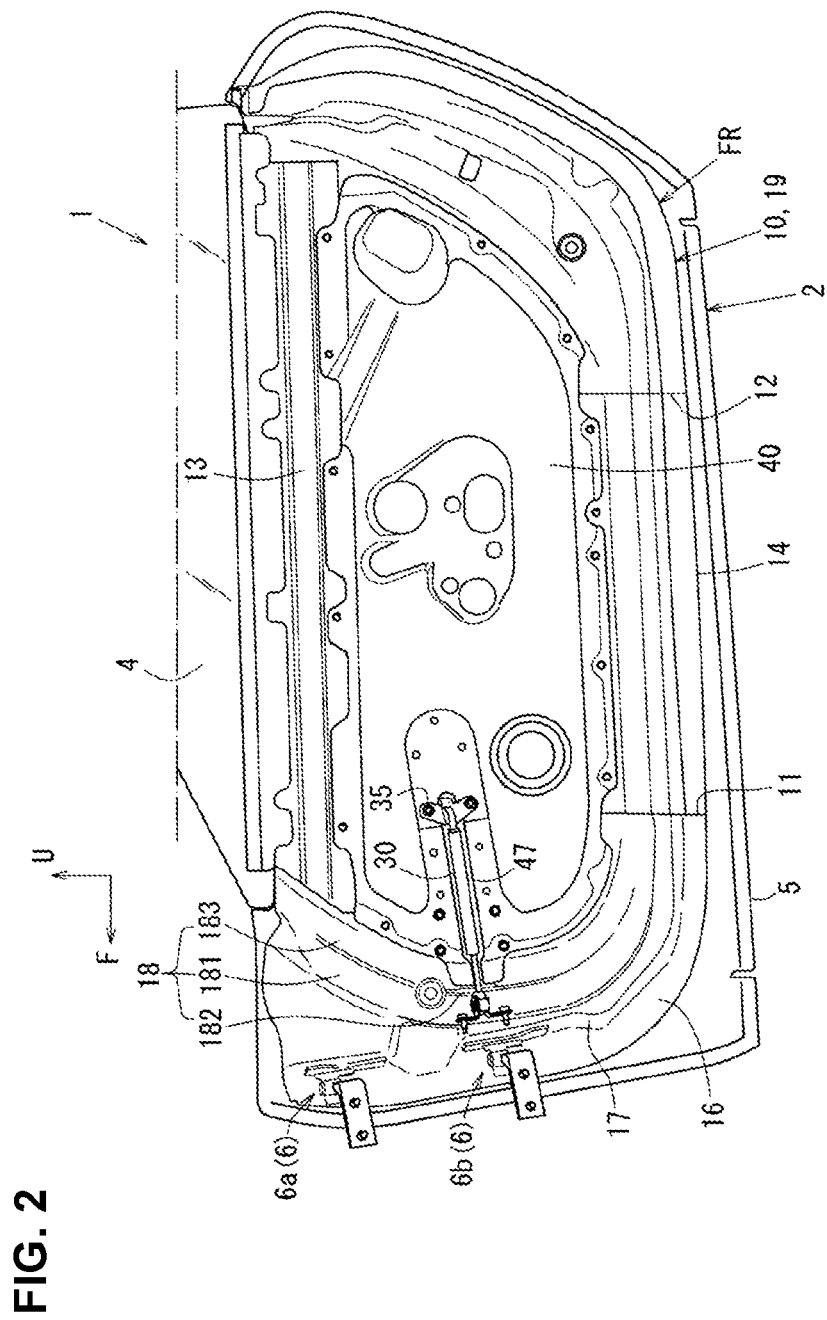
FIG. 2 is a side view of the major part of the side door structure shown in FIG. 1 in a state where a hinge pillar reinforcement and a weatherstrip are removed, when viewed from the cabin inside.
Figure 3:
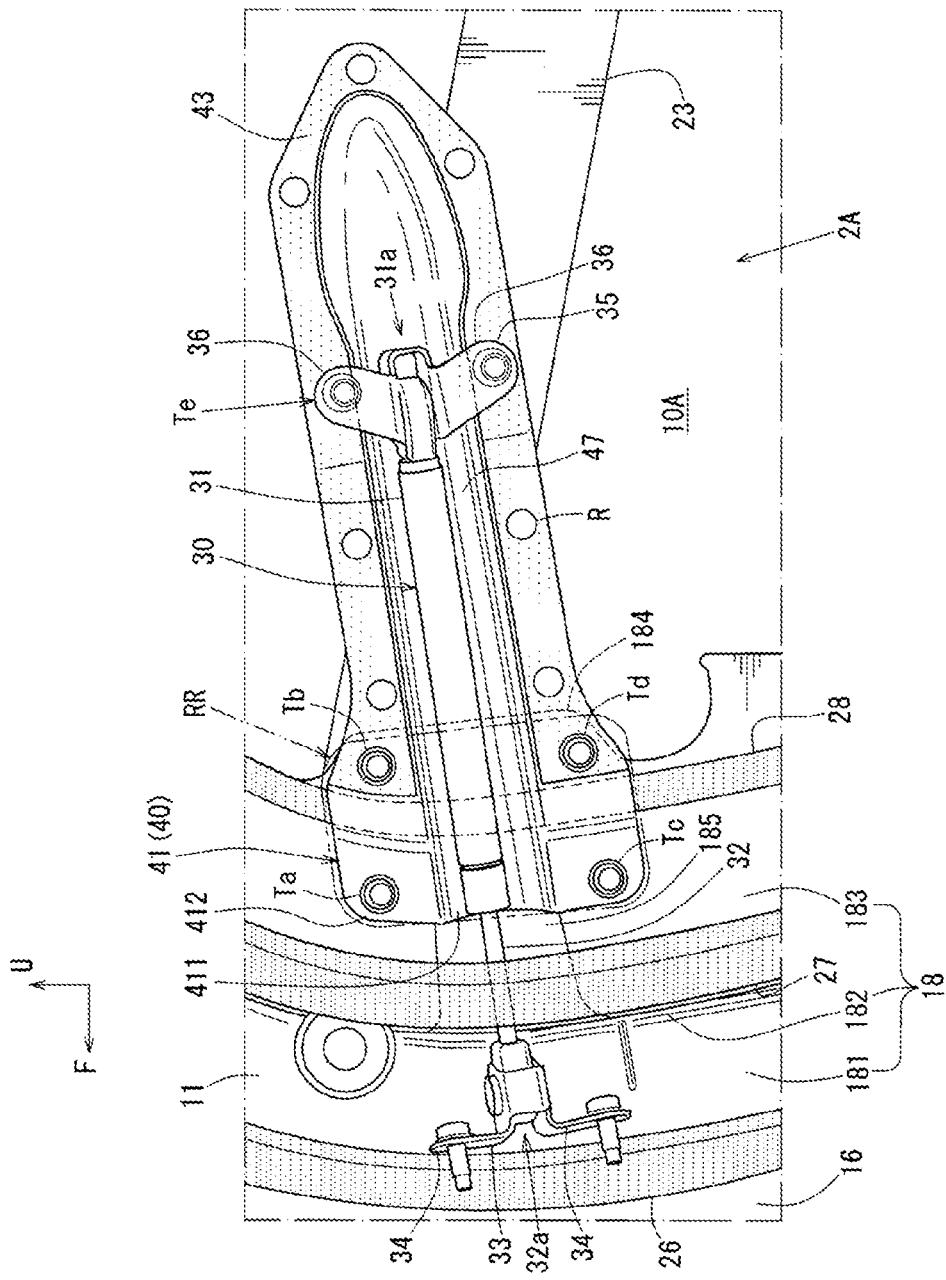
FIG. 3 is an enlarged side view of a major part of the side door in a state where a door trim and a carrier-plate body are removed, when viewed from the cabin inside.
Figure 4:
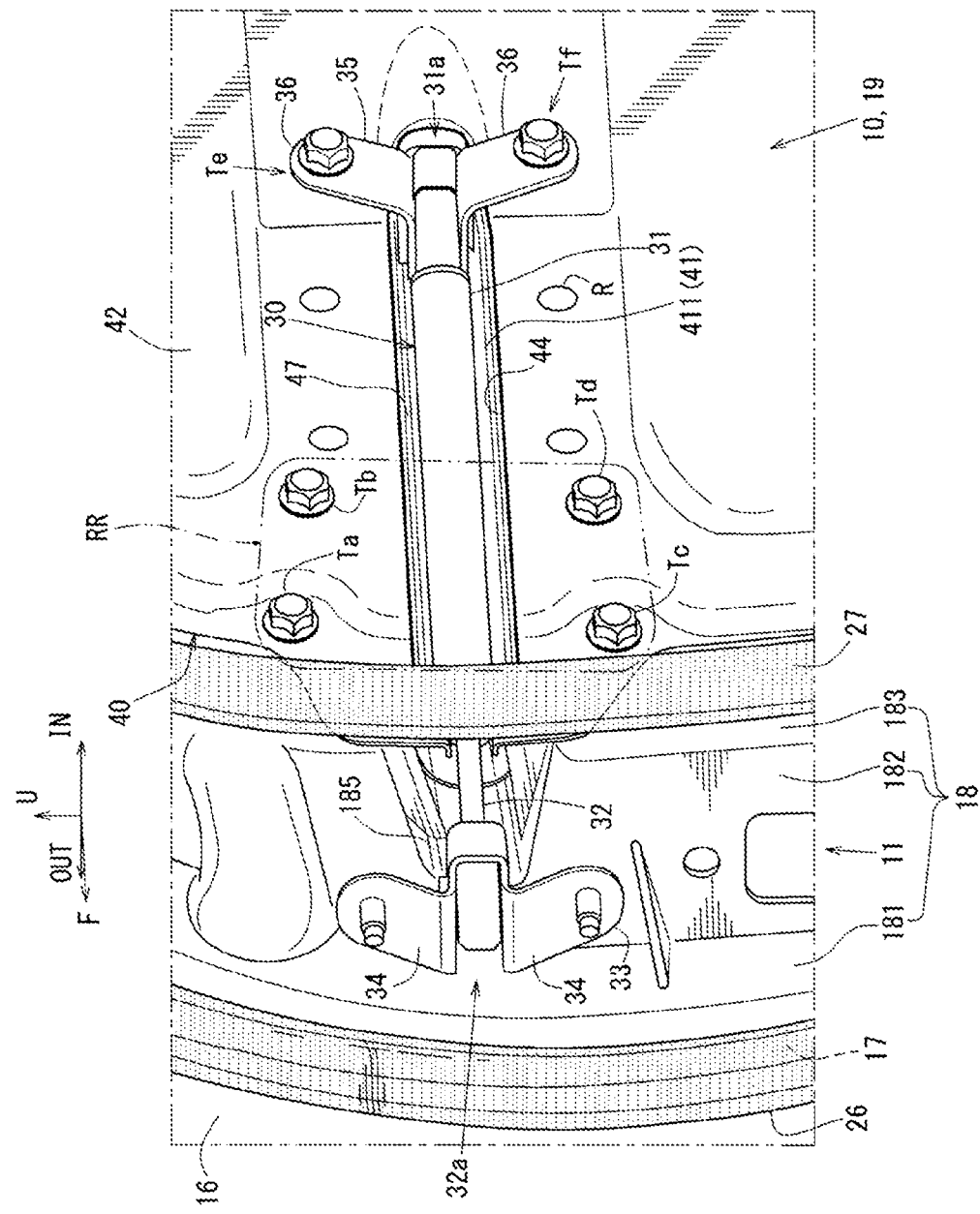
FIG. 4 is a perspective view of the major part of the side door in a state where the door trim is removed, when viewed obliquely from a front-and-cabin inside side.
Figure 5:
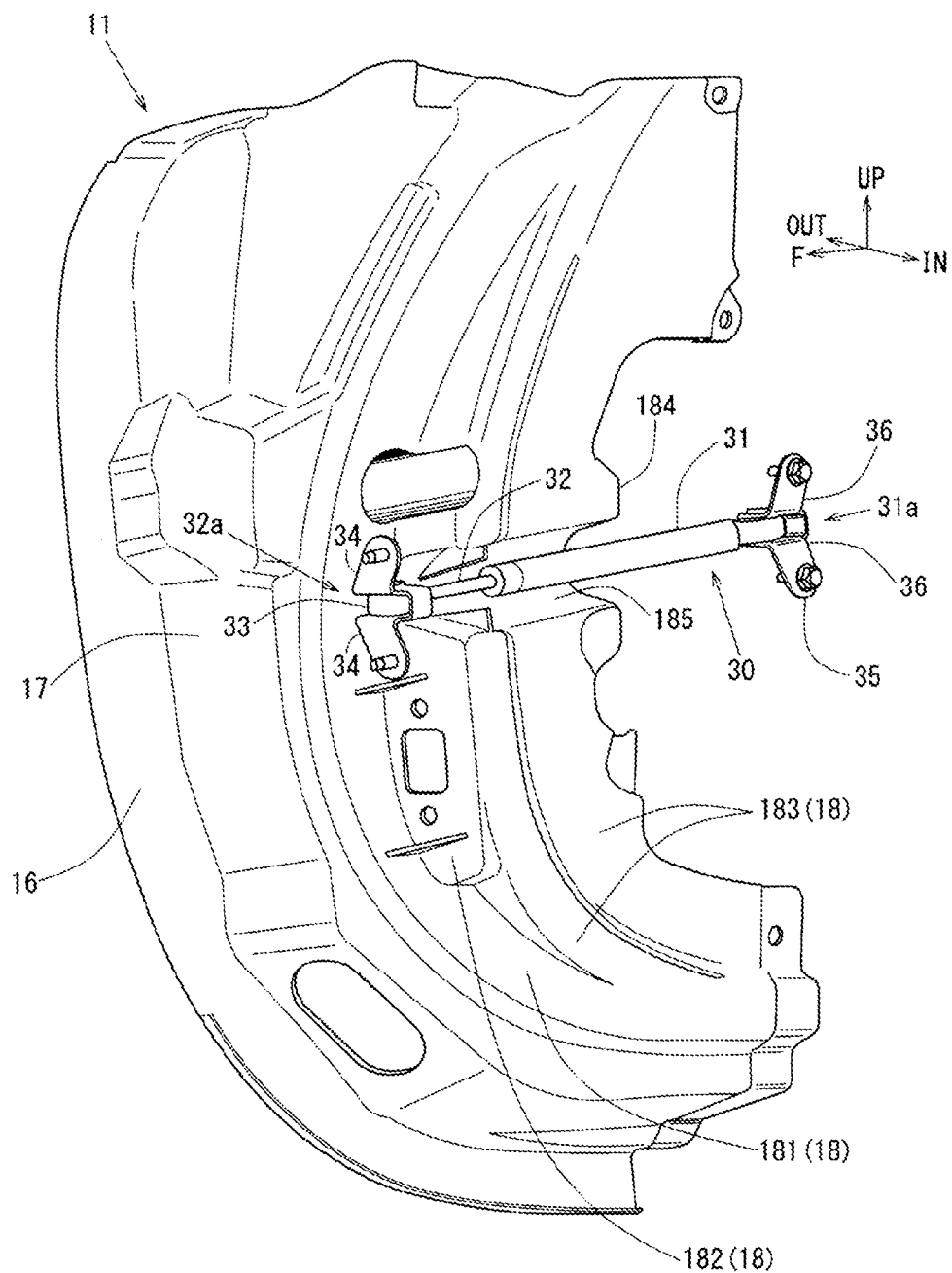
FIG. 5 is a perspective view of a front-side vertical frame portion and a stay damper, when viewed obliquely from the front-and-cabin inside side.
Figure 6:
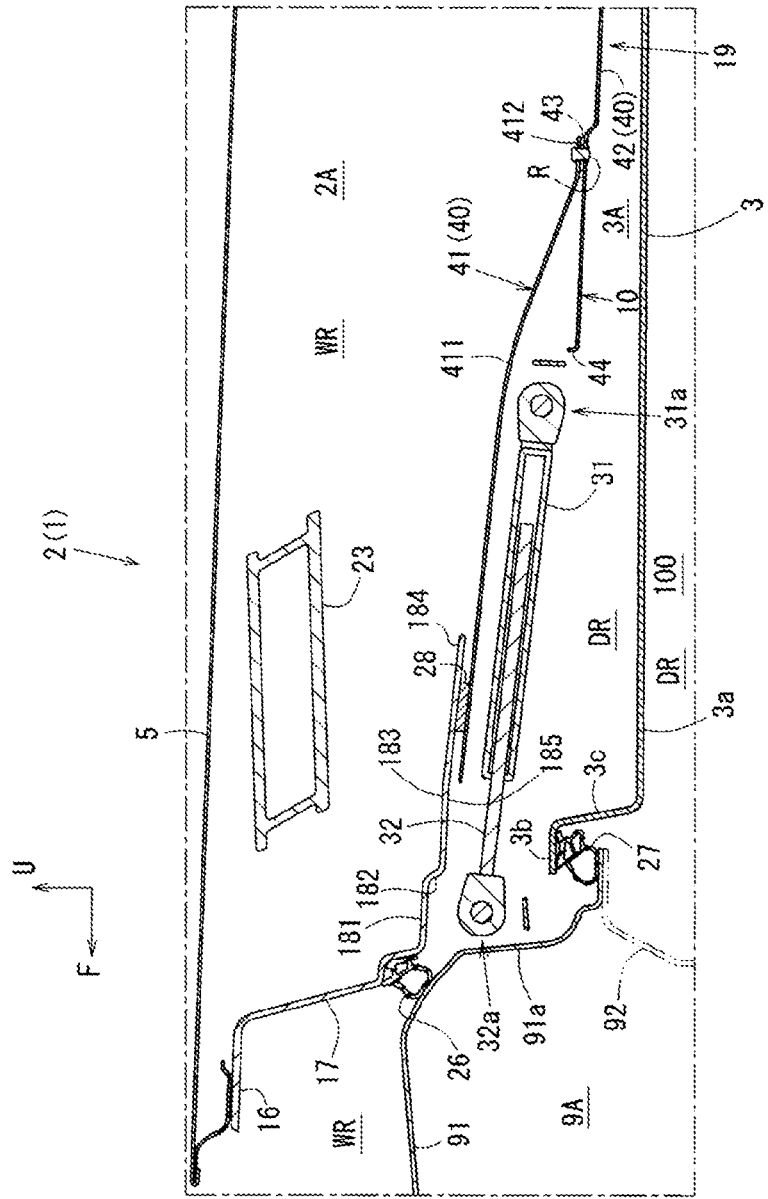
FIG. 6 is a major-part enlarged sectional view taken along line A-A of FIG. 1.
Figure 7:
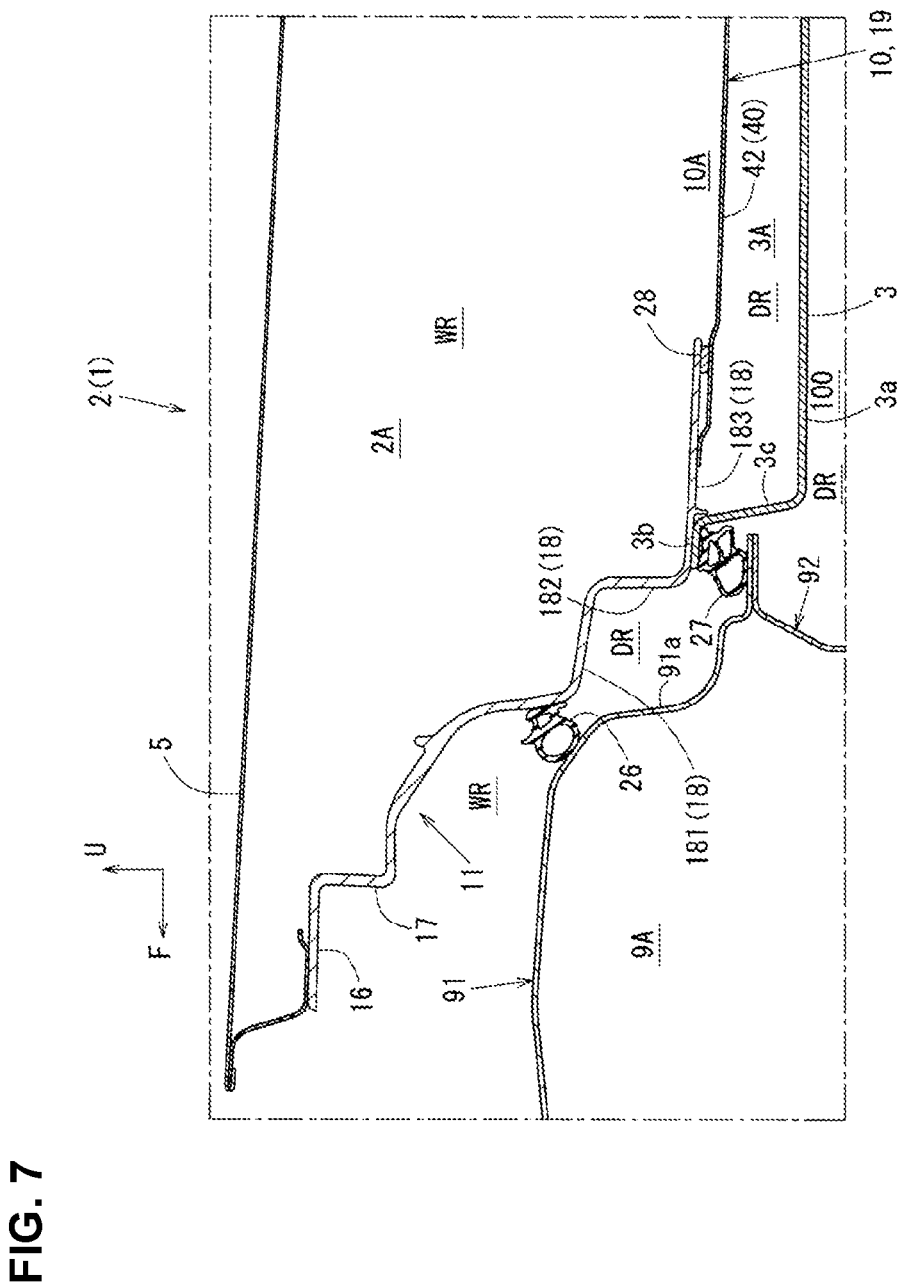
FIG. 7 is a major-part enlarged sectional view taken along line B-B of FIG. 1.
Figure 8A:
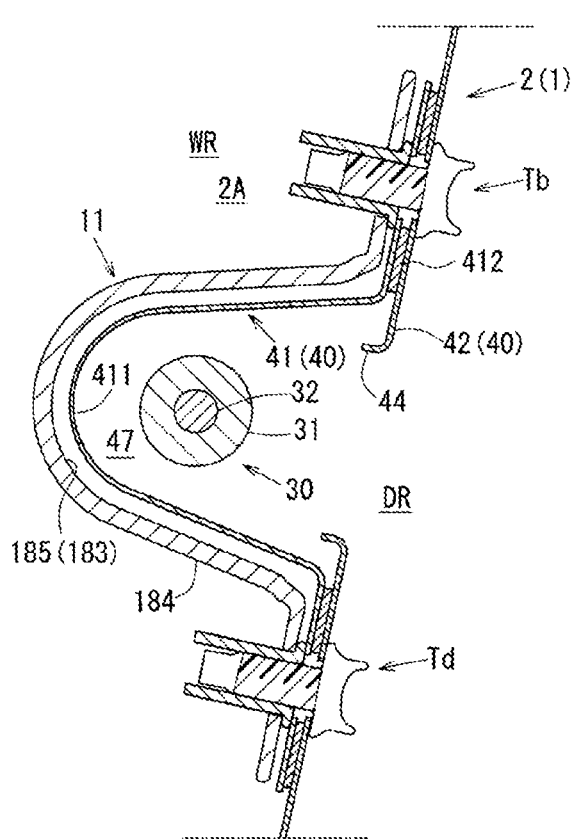
FIG. 8A is an enlarged sectional view taken along line C-C of FIG. 1.
Figure 8B:
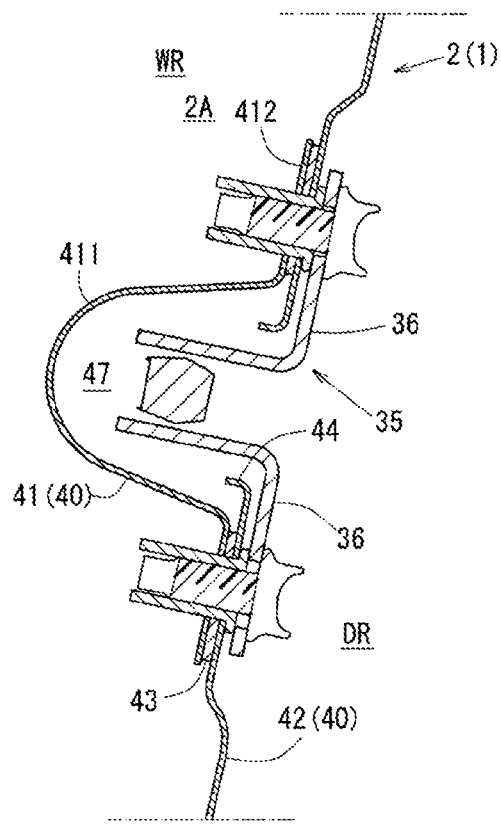
FIG. 8B is an enlarged sectional view taken along line D-D of FIG. 1.
Figure 8B:
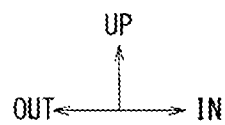
Figure 8B:
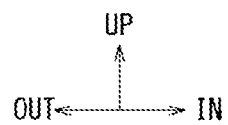

Hereafter, an embodiment of the present invention will be described referring to the drawings. FIG. 1 is a side view showing a side door and a hinge pillar reinforcement of a side door structure according to the present embodiment in a state where a door trim is removed, when viewed from a cabin inside. FIG. 2 is a side view of the side door structure shown in FIG. 1 in a state where the hinge pillar reinforcement and a weatherstrip are removed, when viewed from the cabin inside. FIG. 3 is an enlarged side view of the side door in a state where the door trim and a carrier-plate body are removed, when viewed from the cabin inside. FIG. 4 is a perspective view of the side door in a state where the door trim is removed, when viewed obliquely from a front-and-cabin inside side. FIG. 5 is a perspective view of a front-side vertical frame portion and a stay damper, when viewed obliquely from the front-and-cabin inside side. FIG. 6 is a major-part enlarged sectional view taken along line A-A of FIG. 1. FIG. 7 is a major-part enlarged sectional view taken along line B-B of FIG. 1. FIG. 8A is an enlarged sectional view taken along line C-C of FIG. 1, and FIG. 8B is an enlarged sectional view taken along line D-D of FIG. 1. In the figures, an arrow U shows an upper side of the vehicle, an arrow OUT shows an outward side, in a vehicle width direction, of the vehicle (referred to as a "cabin outside"), an arrow IN shows an inward side, in the vehicle width direction, of the vehicle (referred to as a "cabin inside"). Further, specific illustration of an internal structure of a cylinder body of the stay damper is omitted in FIG. 6.

The vehicle of the present embodiment comprises an opening portion 100 (referred to as a "side door opening") through which a passenger gets on into a cabin or gets out from the cabin (see FIG. 6) and a side door 1 which closes the opening portion 100 (see FIGS. 1 and 2).

As shown in FIGS. 1 and 2, the side door 1 is pivotally supported at a hinge pillar 9 (see FIG. 1) which constitutes a part of a front edge of the opening portion 100 via hinges 6 (see FIG. 2) so as to open or close the opening portion 100.

As shown in FIGS. 1, 6 and 7, the hinge pillar 9 positioned on a vehicle-body side comprises a hinge pillar outer 91, a hinge pillar reinforcement (not illustrated), and a hinge pillar inner 92 which are positioned in order toward the inward side, in the vehicle width direction, of the hinge pillar 9.

Specifically, as shown in FIGS. 6 and 7, the hinge pillar outer 91 is arranged, in the vehicle width direction, between the hinge pilar outer 91 and the hinge pillar inner 92 and has a hat-shaped cross section which is opened to the inward side, in the vehicle width direction, of the hinge pillar 9. The hinge pillar inner 92 has a hat-shaped cross section which is opened to the outward side, in the vehicle width direction, of the hinge pillar 9. The hinge pillar 9 is configured as a vehicle-body frame member which has a closed-cross section space 9A extending in a vertical direction therein by joining the hinge pillar outer 91 and the hinge pillar inner 92 in the vehicle width direction.

As shown in FIG. 1, the side door 1 is a sashless type of door and comprises a door body 2, a resin-made door trim 3 (see FIGS. 6 and 7) which is provided to face the cabin inside when the side door 1 is closed, and a door window 4 (which is not only glass-made but reinforced plastic-made). Illustration of the door trim 3 is omitted in FIGS. 1-4.

As shown in FIGS. 6 and 7, the door trim 3 comprises a side wall portion 3a which is provided on the cabin inside relative to and to face a side wall portion 19 of a door inner 10 which will be described later, an outer peripheral portion 3b which is fixedly attached to the door inner 10 by a fixation means, such as a clip, and a vertical wall portion 3c which interconnects, in the vehicle width direction, an outer edge of the side wall portion 3a and an inner edge of the outer peripheral portion 3b, which are formed integrally.

The door trim 3 is attached to the door inner 10 such that the door trim 3 covers the side wall portion 19 (an inward-wall rear portion 183 of a front-side vertical frame portion 11 and a carrier plate 40) of the door inner 10 from the cabin inside so as to form a space 3A (trim inside space 3A) between the door trim 3 and the door inner 10, and at least a part (cylinder body 31) of a stay damper 30 is stored in this trim inside space 3A (see FIG. 6).

As shown in FIGS. 1 and 2, the door body 2 comprises a door outer 5 as a door outer panel which constitutes an outer panel of the side door 1, the door inner 10 as a door frame, the hinges 6 (see FIG. 2), the stay damper 30 (see FIGS. 1-6), and weatherstrips 25, 26, 27 (see FIG. 1). Additionally, the door body 2 comprises a window regulator to elevate or lower the door window 4, not illustrated, and a door impact bar 23 (see FIGS. 3 and 6).

As shown in FIG. 2, a pair of hinges 6 are provided to be apart, in the vertical direction, from each other, which are fixedly attached to a front edge of the door inner 10. An upper-side hinge 6a of the hinges 6 is attached to the door inner 10 at a position which is located on a slightly forward side of a lower-side hinge 6b. Thereby, the side door 1 is rotated such that its rear end moves obliquely outwardly-and-upwardly as its opening angle increases.

The window regulator (not illustrated) and the door impact bar 23 are attached to the door inner 10 from the vehicle outward side in a state where they are stored in an inside space 2A between the door outer 5 and the door inner 10. The door window 4 is storable in the inside space 2A (see FIG. 6) when being lowered into the door body 2. The door impact bar 23 is located at a level which corresponds to a waist of the passenger seated in a seat in the cabin.

A door upper opening (not illustrated) where the inside space 2A is opened upwardly is formed at an upper end portion (between respective upper end portions of the door outer 5 and the door inner 10) of the door body 2 so that the door window 4 can moves through this door upper opening.

As shown in FIGS. 1 and 2, the door inner 10 comprises the vertical frame portions 11, 12 (the front-side vertical frame portion 11 and the rear-side vertical frame portion 12) which are provided to be longitudinally apart from each other, connecting frames 13, 14 (an upper-side connecting frame 13 and a lower-side connecting frame 14) which are provided to be vertically apart from each other such that they interconnect the front-side vertical frame portion 11 and the rear-side vertical frame portion 12 in the vehicle longitudinal direction, and the carrier plate 40 which is attached to the vertical frame portions 11, 12 and the connecting frames 13, 14 from the cabin inside.

The door inner 10 is constituted by the vertical frame portions 11, 12 and the connecting frames 13, 14 as a frame-shaped body FR which has an opening (central opening) 10A at its center (see FIGS. 3, 6 and 7).

The upper-side connecting frame 13 is an extrusion molding member, and the lower-side connecting frame 14 is a panel forming member, and these frames 13, 14 constitute an upper edge and a lower edge of the door inner 10, respectively.

The front-side vertical frame portion 11 and the rear-side vertical frame portion 12 are respectively made of an aluminum-alloy casting member, and these portions 11, 12 constitute a front edge and a rear edge of the door inner 10, respectively.

The front-side vertical frame portion 11 of the frame-shaped body FR will be described specifically. As shown in FIGS. 2 and 5, the front-side vertical frame portion 11 comprises a flange-shaped outer peripheral edge part 16 which extends continuously from a front edge to a lower edge of the front-side vertical frame portion 11, a step part 17 (see FIG. 5) which protrudes stepwise (in a vertical-wall shape) toward the cabin inside from an inner end (a rear end of the front edge and an upper end of the lower edge) of the outer peripheral edge part 16, and an inward wall part 18 which extends in the vehicle vertical direction and in the longitudinal direction from an inward end, in the vehicle width direction, of the step part 17.

Further, as shown in FIGS. 2-5, the inward wall part 18 comprises an inward-wall front portion 181 which extends in the vehicle vertical direction and in the longitudinal direction, a front wall portion 182 which extends stepwise toward the cabin inside from a rear end of the inward-wall front portion 181, and an inward-wall rear portion 183 which extends rearwardly from the cabin inside of the front wall portion 182. The inward-wall rear portion 183 forms a flush surface together with the carrier plate 40 and also constitutes a part of the side wall portion 19 of the door inner 10 together with the carrier plate 40 (see FIG. 7).

The front wall portion 182 extends in the vertical direction and is configured such that a step amount (degree), in the vehicle width direction, thereof increases gradually from upper-and-lower both end positions thereof toward a central position, in the vertical direction, thereof (see FIG. 5).

The front wall portion 182 of the front-side vertical frame portion 11 mainly faces, in the vehicle longitudinal direction, a rear wall portion 91a of the hinge pillar 9 (the hinge pillar outer 91) (see FIG. 7).

The carrier plate 40 is a panel which serves as the side wall portion 19 of the door inner 10 as well, which is made of aluminum alloy and attached via a door-inner seal member 28 (see FIGS. 3, 6 and 7) from the cabin inside so as to close the central opening 10A.

The door-inner seal member 28 is a seal member to secure the water-proof property between the carrier plate 40 and the frame-shaped body FR and configured to extend along a facing edge section of the carrier plate 40 and the frame-shaped body FR.

Particularly, a front portion of the carrier plate 40 is fixedly attached to the inward-wall rear portion 183 of the front-side vertical frame portion 11 from the cabin inside via the door-inner seal member 28 by bolts or the like.

As shown in FIG. 1, the weatherstrips 25, 26, 27 are respectively an elongated resilient member to seal a space between the side door 1 and the vehicle body when the side door 1 is closed, and these plural sealing members are provided around an outer periphery of the door body 2 so as to surround the carrier plate 40 in an elevational view of the side door 1. The weatherstrips 25, 26, 27 are provided to be apart from each other in order from the cabin inside.

Specifically, there are provided three of the outer-side weatherstrip 25, the intermediate weatherstrip 26, and the inner-side weatherstrip 27. The intermediate weatherstrip 26 and the inner-side weatherstrip 27 extend continuously over a front edge portion and a lower edge portion of the door body 2, respectively. The outer-side weatherstrip 25 is continuously extends mainly over the lower edge portion and a rear edge portion of the door body 2.

As shown in FIGS. 3, 4, 6 and 7, the intermediate weatherstrip 26 and the inner-side weatherstrip 27 are arranged at the front-side vertical frame portion 11 such that a front edge of the intermediate weatherstrip 26 extends along a front edge of the inward-wall front portion 181 and a front edge of the inner-side weatherstrip 27 extends along a front edge of the inward-wall rear portion 183.

Herein, as shown in FIG. 1, the outer-side weatherstrip 25, the intermediate weatherstrip 26, and the inner-side weatherstrip 27 are connected such that respective upper portions of their rear edges are connected together at an upper portion of the rear edge of the door inner 10. Meanwhile, the intermediate weatherstrip 26 and the inner-side weatherstrip 27 are connected such that respective upper portions of their front edges are connected together at an upper portion of the front edge of the door inner 10.

As described above, the space between the side door 1 and the vehicle body is sealed by the weatherstrips 25, 26, 27 when the side door 1 is closed.

Specifically, at the front edge of the side door 1, the front edge of the intermediate weatherstrip 26 and the front edge of the inner-side weatherstrip 27 which are attached to the front-side vertical frame portion 11 of the door body 2 are pressed against the hinge pillar outer 91 together when the side door 1 is closed, so that the water-proof property between the side door 1 and the hinge pillar 9 is secured (see FIGS. 6 and 7).

In the present embodiment, as shown in FIGS. 6 and 7, at the front edge of the side door 1, a space positioned on the cabin outside of the intermediate weatherstrip 26 is set as a pour-water area (wet area) WR and another space positioned on the cabin inside of the intermediate weatherstrip 26 is set as a water-proof area (dry area) DR.

Herein, the inside space 2A (i.e., the space 2A between the door outer 5 and the door inner 10) is also included in the above-described space positioned on the cabin outside of the intermediate weatherstrip 26. The trim inside space 3A is also included in the above-described space positioned on the cabin inside of the intermediate weatherstrip 26. That is, as shown in FIGS. 6 and 7, since there is possibility that water comes into the inside space 2A of the door body 2 from the door upper end opening (not illustrated) of the door body 2 or the like, the inside space 2A is set as the pour-water area WR, whereas the trim inside space 3A is set as the water-proof area DR.

Further, the stay damper 30 is the one for a swing door to assist the opening action of the side door 1 relative to the vehicle body, which comprises, as shown in FIGS. 3-6, a cylindrical-shaped cylinder body 31 and a rod body 32 which is inserted into the cylinder body 31 so as to project from the cylinder body 31, wherein the rod body is configured to project from the cylinder body 31 by a gas pressure sealed in the cylinder body 31.

As shown in FIGS. 4 and 5, the stay damper 30 is attached such that a tip 32a of the rod body 32 is attached to the vehicle body via a bracket 33 positioned on the side of the rod body 32 and a bottom-side end 31a of the cylinder body 31 is attached to the side of the door body 2 via a bracket 35 positioned on the side of the cylinder body 31. That is, as shown in FIG. 6, a whole part of the stay damper 30 is arranged in the trim inside space 3A which is set as the water-proof area DR.

The bracket 33 positioned on the side of the rod body 32 is pivotally pin-joined to the tip 32a of the rod body 32 around an axis which extends nearly in the vertical direction, and the bracket 35 positioned on the side of the cylinder body 31 is pivotally pin-joined to the bottom-side end 31a of the cylinder body 31 around an axis which extends nearly in the vertical direction.

Specifically, the stay damper 30 is arranged along the vehicle longitudinal direction such that when the side door 1 is closed, the tip 32a of the rod body 32 is directed toward a vehicle forward side and the bottom-side end 31a of the cylinder body 31 is directed toward a vehicle rearward side.

Further, as shown in FIGS. 4 and 5, the bracket 33 positioned on the side of the rod body 32 is provided with a pair of upper-and-lower vehicle-body-side attaching flanges 34, and these flanges 34 are fixedly fastened to the rear wall portion 91a of the hinge pillar outer 91 (hinge pillar 9) from the rearward side by bolts or the like (see FIG. 1).

Meanwhile, as shown in FIG. 4, the bracket 35 positioned on the side of the cylinder body 31 is provided with a pair of upper-and-lower door-side attaching flanges 36, and these flanges 36 are fixedly fastened to the carrier plate 40 of the door inner 10 (hinge pillar 9) from the cabin inside by bolts or the like (see FIG. 1).

The above-described stay damper 30 is arranged such that at least the cylinder body 31 is arranged in a recessed portion 47 which is formed at the side wall portion 19 of the door inner 10.

The recessed portion 47 is configured such that a part of the side wall portion 19 of the door inner 10 which substantially corresponds to the stay damper 30 in an elevational view of the door body 2 is recessed toward the cabin outside so that this part of the side wall portion 19 does not interfere with the stay damper 30 when the side door 1 is closed. Specifically, the recessed portion 47 is located at respective nearly-middle positions, in the vehicle vertical direction, of the inward-wall rear portion 183 of the front-side vertical frame portion 11 and a front portion of the carrier plate 40.

As shown in FIGS. 3, 4 and 6, the recessed portion 47 is configured to extend continuously and linearly in the vehicle longitudinal direction over the front-side vertical frame portion 11 and the carrier plate 40 in the elevational view of the door body 2. The recessed portion 47 is provided to slightly slant such that its front side is located at a lower level than its rear side.

As shown in FIGS. 3-6, the recessed portion 47 is configured such that its front end reaches the front end of the inward-wall rear portion 183 of the front-side vertical frame portion 11, i.e., reaches the front wall portion 182. Thereby, the front wall portion 182 is opened toward the vehicle forward side at the front end of the recessed portion 47.

The recessed portion 47 has its width (the length, in the vertical direction, thereof) and its depth (the length, in the vehicle width direction, thereof) which are large enough to avoid any interference of the stay damper 30 with an inner face of the recessed portion 47 (the front-side vertical frame portion 11 and the carrier plate 40) in a state where the stay damper 30 is arranged in the recessed portion 47.

Herein, this recessed portion 47 is configured by setting its width and depth properly in a range of the above-described interference avoidance such that its cross section perpendicular to an extension direction (longitudinal direction) of the recessed portion 47 can be as steep recess-shaped as possible (see FIGS. 8A and 8B).

As shown in FIGS. 3, 4, 6 and 8A, 8B, the carrier plate 40 has a split structure which is constituted by a recessed-portion forming member 41 which forms a part of the recessed portion 47 and a carrier-plate body 42 which corresponds to a base panel portion except the recessed portion 47, and there is further provided a sheet-shaped seal member 43 which is interposed between the recessed-portion forming member 41 and the carrier-plate body 42 so as to seal a space therebetween (see FIGS. 3 and 8A, 8B).

As shown in FIG. 3, the recessed-portion forming member 41 is made of aluminum alloy integrally, which comprises a recessed-shaped portion 411 which corresponds to a portion, in the extension direction, of the recessed portion 47 (another portion than the front side of the recessed portion 47) and a peripheral portion 412 which extends along its periphery except a front edge of the recessed-shape portion 411. Herein, the sheet-shaped seal member 43 is configured to have substantially the same shape as the other part of the recessed-shape forming member 41 than a front portion of the peripheral portion 412.

As shown in FIGS. 4, 6 and 8A, 8B, a notch-shaped groove portion 44 is formed at a portion of the carrier-plate body 42 which corresponds to the recessed portion 47 in the elevational view of the door body 2. This notch-shaped groove portion 44 is configured to penetrate the carrier-plate body 42 in the width direction (plate-thickness direction) and continuously extend rearwardly from the front end of the carrier-plate body 42.

Meanwhile, as shown in FIGS. 3-6 and 8A, a recessed-shaped portion 185 is formed at a portion of the inward-wall rear portion 183 of the front-side vertical frame portion 11 which corresponds to the recessed portion 47 in the elevational view of the door body 2. This recessed-shaped portion 185 is configured to be recessed outwardly in the vehicle width direction and extend continuously over front-and-rear both ends of the inward-wall rear portion 183. The recessed-shaped portion 185 has its slightly-larger width (the length, in the vertical direction, thereof) and depth (the length, in the vehicle width direction, thereof) than the recessed-shaped portion 411 so that the recessed-shaped portion 411 of the recessed-portion forming member 41 can be fit into the recessed-shaped portion 185 (see FIG. 8A).

As shown in FIGS. 3 and 5, a rear edge of the inward-wall rear portion 183 is provided with a rearward extension portion 184 which is configured such that a portion of the rear edge of the inward-wall rear portion 183 which corresponds to the recessed-shaped portion 185 and its upper-and-lower edges extends rearwardly.

As shown in FIGS. 3, 4 and 6, a front part of the door body 2 is configured such that the door-inner seal member 28, the recessed-portion forming member 41, the seal member 43, and the carrier-plate body 42 (see FIGS. 4 and 6) are arranged in order from the cabin inside and integrally attached to the inward-wall rear portion 183 of the front-side vertical frame portion 11.

The front portion of the recessed-portion forming member 41 is arranged from the cabin inside at the rear portion of the inward-wall rear portion 183 of the front-side vertical frame portion 11 (see FIGS. 3-5). Thereby, the peripheral portion 412 of the recessed-portion forming member 41 overlaps with a peripheral portion of the recessed-shaped portion 185 of the inward-wall rear portion 183, including the above-described rearward extension portion 184, in the elevational view of the door body 2. Further, the recessed-shaped portion 411 of the recessed-portion forming member 41 is configured to be fit into the recessed-shaped portion 185 of the inward-wall rear portion 183 from the cabin inside (see FIG. 8A).

Meanwhile, as shown in FIGS. 3 and 6, a portion of the recessed-portion forming member 41 which is located on the rearward side of the front portion extends rearwardly beyond the rear edge of the inward-wall rear portion 183 and therefore does not overlap with the front-side vertical frame portion 11 in the elevational view of the door body 2. Thereby, the above-described recessed portion 47 extending continuously in the vehicle longitudinal direction is formed by the front portion of the recessed-shaped portion 185 which is formed at the inward-wall rear portion 183 (a portion of the recessed-shaped portion 185 which is positioned on the forward side of the front end of the recessed-portion forming member 41) and the recessed-shaped portion 411 of the recessed-portion forming member 41.

Herein, as described above, the door-inner seal member 28 is provided to extend continuously along the periphery of the central opening 10A between the frame-shaped body FR and the carrier plate 40 so as to secure sealing between these members FR, 40 (FIGS. 3 and 6 illustrate the door-inner seal member 28 which is provided, in the vehicle width direction, between the rear portion of the inward-wall rear portion 183 of the front-side vertical frame portion 11 and the front portion of the carrier plate 40).

This door-inner seal member 28 is the seal member to prevent that the water which has come into the inside space 2A of the door body 2 from the door upper-end opening or the like of the door body 2 comes to the cabin inside (to the side of the trim inside space 3A) from the door body's inside space 2A.

The door-inner seal member 28 continuously extends in its extension direction, including a portion which corresponds to the recessed-portion forming member 41 in the elevational view of the door body 2 (a portion which corresponds to the recessed portion 47) (see FIG. 3).

Meanwhile, as described above, the seal member 43 is interposed between the recessed-portion forming member 41 and the carrier-plate body 42 (see FIGS. 3, 6 and 8A, 8B) and arranged along the peripheral portion 412 of the recessed-portion forming member 41 at a position located on the vehicle rearward side of the door-inner seal member 28 in the elevational view of the door body 2 (see FIG. 3).

Thereby, the seal member 43 secures the water-proof property between the recessed-portion forming member 41 and the carrier-plate body 42 especially at the recessed portion 47 and its surrounding in a state where the carrier plate 40 having the split structure is attached to the front-side vertical frame portion 11 as described later.

Further, the carrier-plate body 42 is attached to the front-side vertical frame portion 11 from the cabin inside via the door-inner seal member 28, the recessed-portion forming member 41, and the seal member 43 at the front part of the door inner 10. Herein, the carrier-plate body 42 is arranged such that the groove portion 44 of the carrier-plate body 42 and the recessed-shaped portion 411 of the recessed-portion forming member 41 nearly match each other in the elevational view of the door body 2 (see FIGS. 4, 6 and 8A, 8B) and the carrier-plate body 42 overlaps with the rear portion of the inward-wall rear portion 183 of the front-side vertical frame portion 11 (see FIGS. 4 and 6-8A).

As shown in FIGS. 4 and 8A, the carrier-plate body 42 and the inward-wall rear portion 183 are fastened together by fastening members, interposing the door-inner seal member 28, the recessed-portion forming member 41, and the seal member 43 therebetween, at the above-described overlapping area of the carrier-plate body 42 and the inward-wall rear portion 183 of the front-side vertical frame portion 11, i.e., at the front part of the recessed portion 47 and its periphery.

In the present embodiment, the front-side vertical frame portion 11 and the carrier plate 40 are fastened at respective front-and-rear points of an upper-side edge portion and a lower-side edge portion of the front part of the recessed portion 47, i.e., in total at four points Ta, Tb, Tc, Td (see FIG. 4).

Herein, a position of the rear-side two fastening points Tb, Td among the four fastening points Ta, Tb, Tc, Td of the front-part periphery of the recessed portion 47 in the elevational view of the door body 2 corresponds to a position of the rearward extension portion 184 of the inward-wall rear portion 183 of the front-side vertical frame portion 11.

Meanwhile, at a rear portion positioned on the rearward side of a front portion of the carrier-plate body 42 (in other words, a portion of the carrier-plate body 42 which extends rearwardly beyond a rear end of the inward-wall rear portion 183 of the front-side vertical frame portion 11), the carrier-plate body 42 and the recessed-portion forming member 41 are fastened together by fastening members, interposing the seal member 43 therebetween.

In the present embodiment, the carrier-plate body 42 and the recessed-portion forming member 41 are fastened along a periphery (the upper-side edge portion, the lower-side edge portion, the rear-side edge portion) of a rear part which is positioned on the rearward side of the front part of the recessed portion 47 by rivets R as fastening members (see FIGS. 3 and 4).

Thereby, the sealing property between the carrier plate 40 and the frame-shaped body FR which constitute the split structure, i.e., the water-proof property between the inside space 2A of the door body 2 as the pour-water area WR and the cabin inside space (trim inside space 3A) as the water-proof area DR is secured by the door-inner seal member 28 and the sheet-shaped seal member 43.

Further, since the door-inner seal member 28 and the sheet-shaped seal member 43 are not arranged such that they extend (cross) over the recessed portion 47 in the vertical direction from the cabin inside, the stay damper 30 does not come to interfere with these seal members 28, 43 when the stay damper 30 swings between the inside (the outward side in the vehicle width direction) of the recessed portion 47 and the outside (the inward side in the vehicle width direction) of the recessed portion 47 according to the opening/closing motion of the side door 1.

Moreover, the stay damper 30 is configured as described above such that the bracket 35 positioned on the side of the cylinder body 31 is fixedly fastened to the carrier plate 40 of the door inner 10 from the cabin inside by the bolts as the fastening members (see FIGS. 4 and 8A). In the present embodiment, the pair of upper-and-lower door-side attaching flange 36 which are provided at the bracket 35 positioned on the side of the cylinder body 31 are respectively fastened to the upper edge and the lower edge of the rear part positioned on the rearward side of the front part of the recessed portion 47.

These two fastening points Te, Tf respectively provide the fastening by the recessed-portion forming member 41 and the bracket 35 positioned on the cylinder body 31 in a state where the sheet-shaped seal member 43 and the carrier-plate body 42 are interposed therebetween (see FIG. 8B).

Herein, regardless of the fact that the fastening points Te, Tf of the stay damper 30 to the side door 1 become load input points where a load is inputted from the stay damper 30 when the side door 1 is opened or closed, the bracket 35 positioned on the side of the cylinder body 31 is not attached directly to the front-side vertical frame portion 11 of the door body 2 which has the high rigidity but attached indirectly to the front-side vertical frame portion 11 via the carrier plate 40 which has the lower rigidity than the front-side vertical wall portion 11.

While the above-described attachment structure of the stay damper 30 to the side door 1 is adopted in the present embodiment, the strength of a surrounding area of the fastening points Te, Tf of the bracket 35 positioned on the side of the cylinder body 31 of the stay damper 30 to the carrier plate 40 is secured.

Specifically, the front part of the recessed portion 47 and its periphery are directly fastened to the front-side vertical frame portion 11 which is the casting member at the four fastening points Ta, Tb, Tc, Td as described above.

Thereby, the front part of the recessed portion 47 and its periphery can be constituted as a high-rigidity area RR which has the higher rigidity than the rear part of the recessed portion 47 (see FIGS. 3 and 4).

Further, in the present embodiment, the bracket 35 positioned on the cylinder body 31 of the stay damper 30 is attached to the rear part which is positioned on the rearward side of the front part and its periphery of the recessed portion 47, in other words, attached to a periphery (fastening points Te, Tf) of the recessed portion 47 which continuously extends rearwardly from the high-rigidity area RR.

Herein, since the recessed portion 47 is configured to have the steep cross section at a part of the carrier plate 40 which is configured to have a flat shape as a whole as described above (see FIGS. 8A, 8B), the recessed portion 47 and its periphery can be configured to have the relatively high rigidity compared to the other part of the carrier plate 40.

That is, the recessed portion 47 serves as a bead which continuously connects the fastening points Te, Tf of the high-rigidity area RR of the carrier plate 40 and the stay damper 30, the bracket 35 positioned on the side of the cylinder body 31 of the stay damper 30 is attached to a rear edge portion of the recessed portion 47 in the present embodiment.

Accordingly, while the bracket 35 positioned on the side of the cylinder body 31 is not directly attached to the front-side vertical frame portion 11 having the high rigidity of the door body 2, the strength of the attachment points of the stay damper 30 to the carrier plate 40 can be secured.

The side door structure of the vehicle of the above-describe present embodiment comprises, as shown in FIGS. 1 and 2, the hinge pillar 9 (see FIG. 1) which is provided at the vehicle body and has the closed-cross section space 9A (closed-cross section) extending in the vehicle vertical direction (see FIGS. 6 and 7), the door body 2 (side door body) which comprises the door outer 5 and the door inner 10, the door trim 3 which is provided to cover the door inner 10 from the cabin inside (see FIGS. 6 and 7), and the stay damper 30 which is arranged between the door inner 10 and the door trim 3 such that the stay damper 30 extends rearwardly from the tip 32a of the rod body 32 (see FIG. 6) (one end of the stay damper 30) which is attached to the hinge pillar 9 (see FIG. 1) and to the bottom-side end 31a of the cylinder body 31 (see FIG. 6) (the other end of the stay damper 30) which is attached to the door inner 10 (see FIGS. 3 and 4).

According to this structure, the stay damper 30 can be properly arranged without requiring the seal member nor deteriorating the vehicle getting on/off property of the passenger.

Specifically, the inside space 2A of the door body 2, i.e., the space 2A between the door outer 5 and the door inner 10, corresponds to the pour-water area WR where the water comes in through a slit-shaped door upper-end opening which is provided at each of upper edges of the door outer 5 and the door inner 10 such that the door window 4 is elevated or lowered between the door outer 5 and the door inner 10, for example.

Meanwhile, the trim inside space 3A, i.e., the space 3A formed between the door inner 10 and the door trim 3, corresponds to the water-proof area DR where the water is prevented from coming in by way of the inside space 2A of the door body 2, a gap which is formed between the side door 1 and the vehicle body when the side door 1 is closed, or the like.

Further, by arranging the whole part of the stay damper 30 in the trim inside space 3A such that the stay damper 30 extends rearwardly from the tip 32a of the rod body 32 which is attached to the hinge pillar 9 and to the bottom-side end 31a of the cylinder body 31 which is attached to the door inner 10, the stay damper 30 can be arranged properly without providing the seal member 43 additionally which may be required in a case where the stay damper 30 is provided to extend over the cabin inside (water-proof area DR) and the cabin outside (pour-water area WR) for the door inner 10, for example.

Specifically, unlike a case where a penetration (through) hole is formed at the side wall portion 19 of the door inner 10 such that the inside space 2A of the door body 2 and the trim inside space 3A are connected through this penetration hole and the stay damper 30 is inserted into this penetration hole, for example, it is unnecessary to provide any large-sized seal member to seal a space between the stay damper 30 an edge portion of the above-described penetration hole.

Moreover, since the stay damper 30 is not configured to connect a side sill as a vehicle-body frame member and a lower end of the side door 1, the vehicle getting on/off property of the passenger is not deteriorated.

In the present embodiment, as shown in FIG. 4, the side wall portion 19 of the door inner 10 has the recessed portion 47 which is configured such that a part of the side wall portion 19 of the door inner 10 is recessed toward the cabin outside and to extend rearwardly from the front wall portion 182 (front end), and the stay damper 30 is arranged in the recessed portion 47.

According to this structure, a gap between the door trim 3 and a standard face of the door inner 10 can be made properly small, and the support rigidity of the stay damper 30 by the door inner 10 can be improved.

Specifically, while a pressing force from the stay damper 30 is applied to the door inner 10 in an axial direction of the stay damper 30, the magnitude of a door's thickness-directional element (an outward force) of this pressing force becomes greater as the opening of the side door 1 becomes larger.

Herein, in the present embodiment, the recessed portion 47 configured to extend rearwardly from the front end and be recessed toward the cabin outside is formed at the side wall portion 19 of the door inner 10, and the stay damper 30 is attached to the edge portion of the recessed portion 47 of the door inner 10.

Thereby, since the recessed portion 47 performs the bead-like function as described above, the support rigidity of the door inner 10 against the pressing force applied in the axial direction from the stay damper 30 can be improved. Specifically, the recessed portion 47 of the present embodiment extends so as to connect the front-side high rigidity area RR and the attachment portion of the stay damper 30 to the door inner 10 which is positioned on the rearward side of this high rigidity area RR, so that the rigidity of an area extending from the attachment portion of the carrier plate 40 to the front-side vertical frame portion 11 to the edge portion of the recessed portion 47 can be increased.

Thus, the rigidity around the attachment portion of the stay damper 30 to the door inner 10 which becomes an input point of the load from the stay damper 30 can be increased by the recessed portion 47, so that the door inner 10 can be prevented from being deformed by the pressing force applied from the stay damper 30 in the axial direction, thereby opening/closing the side door 1 with an accurate angle.

In the present embodiment, as shown in FIG. 5, the door inner 10 has the front wall portion 182 at the front end of the side wall portion 19 such that the front wall portion 182 is located at the position which faces the rear wall portion 91a of the hinge pillar outer 91 (hinge pillar 91) (see FIG. 7), the front-side vertical wall portion 11 (door-inner front part) including the front wall portion 182 is made of the casting member, and the recessed portion 47 is continuous to the front wall portion 182 (see FIG. 4).

According to this structure, the appearance of the recessed portion 47 which is continuous to the front wall portion 182 can be improved by making the front-side vertical wall portion 11 of the casting member. That is, the recessed portion 47 can be provided at a proper place precisely with its appropriate width size so as to avoid its interference with the stay damper 30.

The recessed portion 47 is continuous from the rear side of the door inner 10 to the front wall portion 182, so that the front wall portion 182 positioned at the front end of the recessed portion 47 can be configured to be opened to the froward side. Thereby, the stay damper 30 can be arranged in the recessed portion 47 such that it extends rearwardly from the front end of the recessed portion 47 in a state where the bracket 33 positioned on the side of the rod body 32 is attached to the rear wall portion 91a of the hinge pillar 9.

Further, since the stay damper 30 can be arranged in the recessed portion 47 so as to extend in the extension direction of the recessed portion 47, this stay damper 30 can be provided at the side wall portion 19 of the door inner 10 without forming any penetration hole for insertion of the stay damper 30 to extend through the inside of the side wall portion 19 (pour-water area WR) and the outside of the side wall portion 19 (the water-proof area DR). Accordingly, the water-proof property of the door body 2 can be improved as well.

In the present embodiment, as shown in FIGS. 3, 6, and 8A, 8B, the side wall portion 19 of the door inner 10 which extends rearwardly beyond the front-side vertical frame portion 11 is made of the carrier plate 40 as the panel member, and the carrier plate 40 is configured to have the split structure such that the recessed portion 47 is the recessed-portion forming member 41 as a separate member from the carrier-plate body 42 as a base panel part of the side wall portion 19 which corresponds to another part than the recessed portion 47.

According to this structure, by configuring the recessed portion 47 to be separate from the carrier-plate body 42, the dimension control of the recessed portion 47 can be facilitated, and also since the forming property of the recessed portion 47, i.e., the recessed-portion forming member 41, can be improved, the recessed portion 47 can be configured such that its cross section is as steep recess-shaped as possible toward the cabin outside. Accordingly, the recessed portion 47 can be made compact and also its rigidity can be increased properly.

Further, since the recessed portion 47 is separate from the carrier-plate body 42, the recessed-portion forming member 41 may be made of a higher-rigidity material than the carrier-plate body 42 which is made of aluminum or the like, or a thicker plate member. Thereby, the rigidity of the recessed-portion forming member 41 may be so increased that the rigidity of the door inner 10 can be properly increased.

The present invention is not limited to the above-described embodiment but able to be materialized by any other various modifications.

Figure 9:
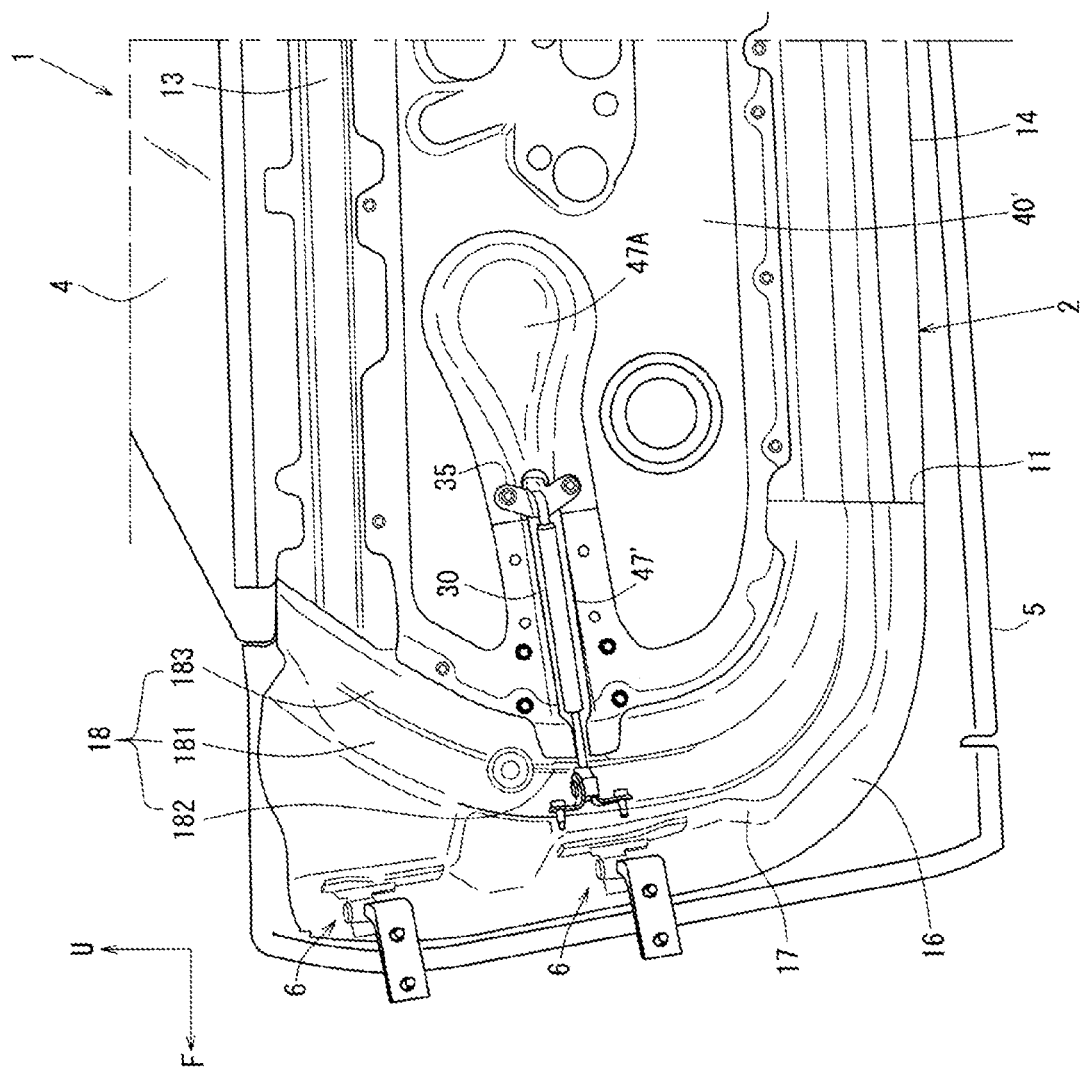
FIG. 9 is a side view of a modification of the front side of the side door structure of the present embodiment shown in FIG. 2.

A carrier plate 40' according to a modification is not configured to have the above-described split structure in which the recessed-portion forming member 41 and the carrier-plate body 42 are separate from each other, but configured to be integrally made of aluminum alloy including the portion corresponding to the recessed portion 47' as shown in FIG. 9. FIG. 9 is a side view of this modification of the front side of the side door structure of the present embodiment shown in FIG. 2.

A wide recessed portion 47A is formed at a part of the carrier plate 40' which is positioned on the rearward side of the recessed portion 47' such that it extends rearwardly from a rear end of the recessed portion 47' and has larger width than the recessed portion 47'.

This wide recessed portion 47A is configured to be continuous from the rear end of the recessed portion 47' and such that the depth, the vehicle width direction, thereof becomes shallower as it goes from a position right behind the recessed portion 47' to its upper side, its lower side, and its rearward side.

Thus, by forming the wide recessed portion 47A at the part of the carrier plate 40' which is positioned on the rearward side of the recessed portion 47', the carrier plate 40' can be integrally made of aluminum alloy including the portion corresponding to the recessed portion 47'.

That is, the aluminum-alloy-made carrier plate has a merit of the light weight but a disadvantage of the poor ductility property. Accordingly, in a case where the carrier plate is integrally made of aluminum alloy including the recessed portion, an area between the recessed portion and the periphery of the recessed portion is forced to have a sharp shape-change when the carrier plate is made, so that there is a concern that cracks may be generated at the recessed portion or the periphery of the recessed portion or wrinkles may remain there.

However, the above-described recessed portion 47' having the wide recessed portion 47A positioned on its rearward side can serve as a portion to absorb distortion which may be generated at the periphery of the recessed portion 47' when the carrier plate 40' is made, so that it can be prevented that the cracks are generated at the recessed portion 47' or the periphery of the recessed portion 47' or the wrinkles remain there.

By configuring the carrier plate 40' to be made of a single member, not to have the split structure, as described above, the parts number can be reduced. Herein, the carrier plates 40, 40' of the above-described embodiment and modification may be made of any other material, such as synthetic resin, than aluminum apply.

Further, the stay damper 30 of the present invention may not be necessarily arranged in the recessed portions 47, 47' formed at the side wall portion 19 of the door inner 10 as long as the whole part of the stay damper 30 is arranged in the trim inside space 3A between the door inner 10 and the door trim 3.

What is claimed is:

1. A side door structure of a vehicle, comprising:
   a hinge pillar provided at a vehicle body, the hinge pillar having a closed-cross section extending in a vehicle vertical direction;
   a door body of a side door, the door body comprising a door outer and a door inner;
   a door trim provided to cover the door inner from a cabin inside; and
   a stay damper arranged between the door inner and the door trim such that the stay damper extends rearwardly from a front end thereof which is attached to the hinge pillar and to a rear end thereof which is attached to the door inner.

2. The side door structure of the vehicle of claim 1, wherein a side wall portion of said door inner has a recessed portion which is configured such that a part of the side wall portion of the door inner is recessed toward a cabin outside and to extend rearwardly from a front end thereof, and said stay damper is arranged in said recessed portion.

3. The side door structure of the vehicle claim 2, wherein said door inner has a front wall portion at a front end of said side wall portion such that the front wall portion is located at a position which faces a rear wall portion of said hinge pillar, a door-inner front part including said front wall portion is made of a casting member, and said recessed portion is continuous to said front wall portion.

4. The side door structure of the vehicle of claim 3, wherein said side wall portion of the door inner which extends rearwardly beyond said door-inner front part is made of a panel member, and said panel member is configured to have a split structure such that said recessed portion is a member which is separate from a base panel part of said side wall portion which corresponds to another part than said recessed portion.

5. The side door structure of the vehicle of claim 1, wherein said stay damper is a damper for a swing door to assist opening action of the side door relative to the vehicle body, which comprises a cylindrical-shaped cylinder body and a rod body which is inserted into the cylinder body so as to project from the cylinder body, and said rod body of the stay damper is configured to project from the cylinder body by a gas pressure sealed in the cylinder body.

6. The side door structure of the vehicle of claim 1, wherein a whole part of said stay damper is arranged in a trim inside space which is formed between said door inner and said door trim.

7. The side door structure of the vehicle of claim 5, wherein said stay damper is configured such that a tip of said rod body is attached to the vehicle body via a bracket positioned on a side of the rod body and a bottom-side end of said cylinder body is attached to a side of said door body via a bracket positioned on the cylinder body.

8. The side door structure of the vehicle of claim 5, wherein said stay damper is arranged along a vehicle longitudinal direction such that when the side door is closed, a tip of said rod body is directed toward a vehicle forward side and a bottom-side end of said cylinder body is directed toward a vehicle rearward side.

9. The side door structure of the vehicle of claim 5, wherein a whole part of said stay damper is arranged in a trim inside space which is formed between said door inner and said door trim.

10. The side door structure of the vehicle of claim 8, wherein said stay damper is configured such that said tip of the rod body is attached to the vehicle body via a bracket positioned on a side of the rod body and said bottom-side end of the cylinder body is attached to a side of said door body via a bracket positioned on the cylinder body.

11. The side door structure of the vehicle of claim 9, wherein said stay damper is configured such that a tip of said rod body is attached to the vehicle body via a bracket positioned on a side of the rod body and a bottom-side end of said cylinder body is attached to a side of said door body via a bracket positioned on the cylinder body.

12. The side door structure of the vehicle of claim 9, wherein said stay damper is arranged along a vehicle longitudinal direction such that when the side door is closed, a tip of said rod body is directed toward a vehicle forward side and a bottom-side end of said cylinder body is directed toward a vehicle rearward side.

13. The side door structure of the vehicle of claim 3, wherein said side wall portion of the door inner which extends rearwardly beyond said door-inner front part is made of a panel member, and said panel member is configured to be integrally made including a portion corresponding to said recessed portion.

* * * * *